(12) United States Patent
Barry (10) Patent No.: US 8,145,714 B2
(45) Date of Patent: Mar. 27, 2012

(54) METHOD AND SYSTEM FOR TRANSACTION COMMUNICATION

(75) Inventor: Mona Elisabeth Barry, Pleasanton, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1116 days.

(21) Appl. No.: 10/641,628

(22) Filed: Aug. 15, 2003

(65) Prior Publication Data
US 2007/0174403 A1 Jul. 26, 2007

(51) Int. Cl.
*G06F 15/16* (2006.01)
(52) U.S. Cl. ........................................ 709/206
(58) Field of Classification Search .................. 709/207, 709/206
See application file for complete search history.

(56) References Cited

U.S. PATENT DOCUMENTS

| 7,035,942 | B2 * | 4/2006 | Daniell et al. ............... 709/246 |
| 7,185,059 | B2 * | 2/2007 | Daniell et al. ............... 709/206 |
| 7,480,638 | B1 * | 1/2009 | Sze ................................ 705/80 |
| 2001/0047305 | A1 * | 11/2001 | Bowen, Jr. ...................... 705/26 |
| 2002/0052802 | A1 * | 5/2002 | Westbrook et al. ............. 705/26 |
| 2002/0087645 | A1 * | 7/2002 | Ertugrul et al. ............... 709/206 |
| 2002/0178087 | A1 * | 11/2002 | Henderson et al. ............. 705/26 |
| 2002/0198743 | A1 * | 12/2002 | Ariathurai et al. ............... 705/4 |
| 2003/0032480 | A1 * | 2/2003 | Keith ............................ 463/42 |
| 2003/0065721 | A1 * | 4/2003 | Roskind ....................... 709/204 |

FOREIGN PATENT DOCUMENTS

WO  WO 02/07058  *  7/2000

OTHER PUBLICATIONS

Council for Electronic Billing and Payment, "Business-to-Business EIPP: Presentment Models and Payment Options, Part One: Presentment Models," Jan. 2001, NACHA, Herndon, VA (available at http://www.ebilling.org/EIPP/B2b.pdf).

* cited by examiner

*Primary Examiner* — John MacIlwinen
(74) *Attorney, Agent, or Firm* — Kilpatrick Townsend & Stockton LLP (57) ABSTRACT

A method and system for transaction communication are described. Using transaction data stored on a transaction system, communication between two parties is facilitated by identifying the relevant parties to each other and providing, through the transaction system, an option for them to communicate via instant messaging. The content of any instant messaging session may also be saved to the transaction system.

18 Claims, 11 Drawing Sheets

Review Invoices

Invoice Inquiry

| Invoice: | ONL | 🔍 | Invoice Status: | Dispute Schedule ▼ | | Search |
|---|---|---|---|---|---|---|
| Buyer: | | 🔍 | Payment Status: | ▼ | | |
| Supplier: | | 🔍 | View: | Invoices ▼ | | Clear |

| 1st Sort: | Due Date ▼ | By: | Descending ▼ | 2nd Sort: | Invoice ▼ | By: | Ascending ▼ | Sort | See Legend |

▶ Advanced Search

Invoice Summary  Customize | Find | View All | 📇  First ◀ 1-3

| Invoice Inquiry | Share Invoice Detail | | | | | | | | |
|---|---|---|---|---|---|---|---|---|---|
| Sel | Invoice | Inv Date | Gross Amount | Curr | Over | Buyer Name | Supplier | App | Match | Terms |
| ☐ | ONLB03FR1 | 04/01/2002 | 6,890.00 | USD | 449 | Choice Ind | Fromage Importers | ↻ ☑ | ☐ 📇 | Due Now |
| ☐ | ONLB02TT2 | 04/12/2002 | 8,800.99 | USD | 438 | DS Telecom | Treat's | ↻ ☑ | ☐ 📇 | Due Now |
| ☐ | ONLB01FG1 | 04/13/2002 | 7,400.00 | USD | 437 | Dean Jones | Fromage Importers | ↻ ☑ | ☐ 📇 | Due Now |

Review Invoices
Invoice Inquiry

400

| | | |
|---|---|---|
| Invoice: ONL | 🔍 | Invoice Status: No Disputes ▼ |
| Buyer: | 🔍 | Payment Status: ▼ |
| Supplier: | 🔍 | View: Invoices ▼ |

| 1st Sort: Due Date ▼ | By: Descending ▼ | 2nd Sort: Invoice ▼ | By: Ascending ▼ | Sort | Clear |
|---|---|---|---|---|---|

Search

See Legend

▲ Advanced Search

Customize | Fin

Invoice Summary

| Invoice Inquiry | More Invoice Criteria |

| Sel | Invoice | Inv Date | Gross Amount | Curr | Over | Buyer Name | Supplier | Appr | Match | Hold | Terms |
|---|---|---|---|---|---|---|---|---|---|---|---|
| ☐ | ONLB01FM1 | 06/01/2002 | 650.90 | USD | 438 | DS Telecom | Fromage Importers | ↻ | ☑ | ☐ | Hold 📄 Due Now |
| ☐ | ONLB03FY2 | 04/13/2002 | 55,440.00 | USD | 457 | Choice Ind | Friday's Office Supplies | ↻ | ☑ | ☐ | Hold 📄 Net 30 |
| ☐ | ONLB01BK1 | 06/01/2002 | 500.00 | USD | 438 | Dean Jones | Books for You | ↻ | ☑ | ☐ | Hold 📄 Due Now |

Review Invoices
Review Invoice Disputes

Invoice: ONLBO2TT2    Buyer: BUY02    Supplier: DS Telecommunications    Voucher: 00000017

Invoice Date: 04/12/2002    Supplier: TREATS    Treat's    Supplier Location: 1

Payment Details    Find | View All    First ◄ 1 of 1 ► Last    *{510}*

Pymnt Nbr: 1    Payment Amount: 8,800.99 USD    Scheduled: 04/25/2002

Status: Not Selected for Payment    Due Date: 04/12/2002

Old Comments: eSettlements Buyer User (25 Apr 02 12:00 AM): Shipment was short, will pay invoice once all goods are received - thanks ☑ Hold Payment    Reason: [Goods in Dispute ▼]

New Comments: *{520}*

[blank text area]

Save    Return to Invoice Inquiry    *{530}*
         Discuss with IM *{530}*

Review Invoices

Review Invoice Disputes

Buyer ID: BUY03  Choice Industries  Invoice: ONLB03FR1  Voucher: 00000013

Supplier: FROMAGE  Fromage Importers  Date: 04/01/2002

Payment Details

Find | View all  First ◄ 1 of 1 ▲ Last  —510

| | | | |
|---|---|---|---|
| Pymnt Nbr: | 1 | Payment Amount: | 6,890.00 USD |
| Status: | Not Selected for Payment | Scheduled: | 04/25/2002 |
| | | Due Date: | 04/01/2002 |

Old Comments: eSettlements Buyer User (25 Apr 02 12:00 AM): Shipment was short, will pay invoice once all good are received - thanks ☑ Hold Payment Reason: Goods in Dispute ▼

New Comments:  —520

Elisabeth: Hi Suzy...Our receiving department found that the additional goods had been shipped in your original shipment.
Elisabeth: So we will resolve this dispute and pay the invoice.

710

Return to Invoice Inquiry
Discuss with Yahoo IM —530

Save
810

FIG. 8A

Review Invoices

Review Invoice Disputes

Buyer ID: BUY03  Choice Industries  Invoice: ONLB03FR1  Voucher: 00000013
Supplier: FROMAGE  Fromage Importers  Date: 04/01/2002

Payment Details  Find | View All  First ◀ 1 of 1 ▶ Last

Pymnt Nbr: 1  Payment Amount: 6,890.00 USD  Scheduled: 04/25/2002
Status: Not Selected for Payment  Due Date: 04/01/2002

Old Comments:  { 710
eSettlements Buyer User (18 Mar 03 04:40 PM): Elisabeth: Hi Suzy...Our receiving department found that the additional goods had been shipped in your original shipment.
Elisabeth: So we will resolve this dispute and pay the invoice.
Liz: Thanks, won't do anything on our end and await payment.
Elisabeth: Okay, thanks. Sorry for the delay.
eSettlements Buyer User (25 Apr 02 12:00 AM): Shipment was short, will pay invoice once all good are received - thanks
} 510

☐ Hold Payment  Reason: [▼]

New Comments:

520

Save  Return to Invoice Inquiry
810    Discuss with Yahoo IM  530

FIG. 8B

METHOD AND SYSTEM FOR TRANSACTION COMMUNICATION

BACKGROUND OF THE INVENTION

1. Field of the Invention

The present invention relates to a method and system for transaction communication. More particularly, the present invention relates to a method and system for transaction communication which identifies the relevant parties to each other and provides an option for them to communicate via instant messaging.

2. Description of Related Art

Enterprise resource planning (ERP) systems seek to automate and integrate multiple business processes within an organization. An ERP system may include components for customer relations management, asset management, expense reports, human resources, electronic bill presentment and payment, and other functions. An ERP system may include an electronic invoice presentment and payment (EIPP) system which allows a buyer to receive an invoice in electronic format from the seller through the EIPP system. The EIPP system is typically accessed by both the buyer and the seller through a network, and seeks to facilitate the invoice presentment and payment process.

However, if an invoice dispute arises, the buyer must first determine an appropriate individual to contact at the seller location, and then contact the individual by mail, facsimile, telephone, electronic mail, or face-to-face.

What is needed is a method and system for allowing a buyer to contact a seller about an invoice dispute more easily and quickly. What is needed is a method and system for allowing the parties to a transaction to communicate more easily.

SUMMARY OF THE INVENTION

The present invention is directed towards a method for transaction communication in a transaction system. The method comprises identifying to a first party to a transaction a second party to the transaction when data associated with the transaction is accessed by the first party through the transaction system. An instant messaging presence of the second party is indicated to the first party through the transaction system. An option to communicate with the second party via instant messaging is presented to the first party through the transaction system. An instant messaging session is established between the first party and the second party when the first party selects the option. Further, the content of the instant messaging session can be saved on the transaction system.

The present invention is also directed towards a transaction system for transaction communication. The transaction system comprises a transaction engine and a storage subsystem connected to the transaction engine. The storage subsystem is capable of storing data associated with a transaction, the data including identities of a first party and a second party associated with the transaction. An interface subsystem is also connected to the transaction engine. The interface subsystem is capable of displaying to the first party the identity of the second party when the first party accesses the data through the transaction system. The interface subsystem is also capable of displaying to the first party an option to communicate with the second party via instant messaging. The interface subsystem is also capable of displaying to the first party an instant messaging presence of the second party. An instant messaging subsystem is also connected to the transaction engine. The instant messaging subsystem is capable of at least assisting in determining the instant messaging presence of the second party and at least assisting in establishing the instant messaging session between the first party and the second party. The instant messaging subsystem is also capable of saving a content of the instant messaging session on the storage subsystem.

DETAILED DESCRIPTION OF THE INVENTION

A method and system for transaction communication uses transaction data stored on a transaction system to allow parties to a transaction to communicate via instant messaging. The transaction data typically includes a role or function of the parties. The transaction data also typically includes instant messaging contact information for the parties, for example, in the form of a username or login identification (ID). The role or function information is used to identify the appropriate parties to each other. For example, a buyer user accessing invoice data on the transaction system will be shown a list of seller users. The instant messaging contact information is used in providing an option to establish an instant messaging session and in establishing the instant messaging session. For example, when a buyer user wants to initiate an instant messaging session with a seller user, the instant messaging contact information for the seller user stored on the transaction system will be used to establish an instant messaging session. This works in reverse as well when the seller user is the first party; buyer users stored on the transaction system will be used to identify and establish an instant messaging session.

Figure 1A:
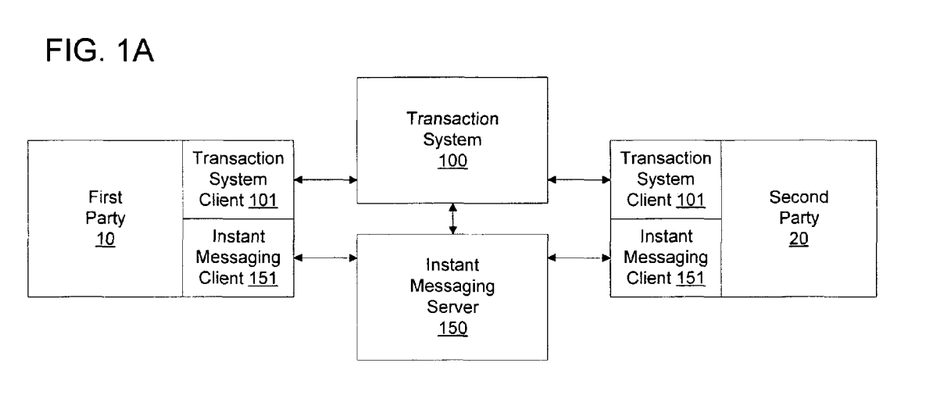
FIGS. 1A through 1C show examples of how the transaction system of the present invention is connected to the parties.
Figure 1B:
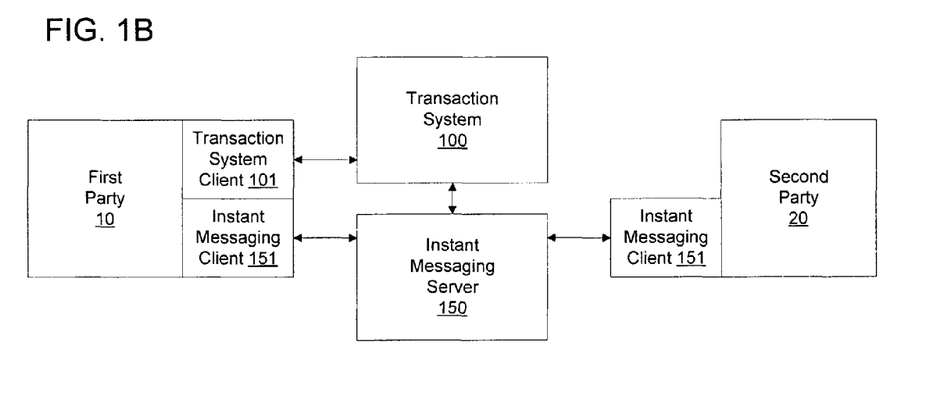
Figure 1C:
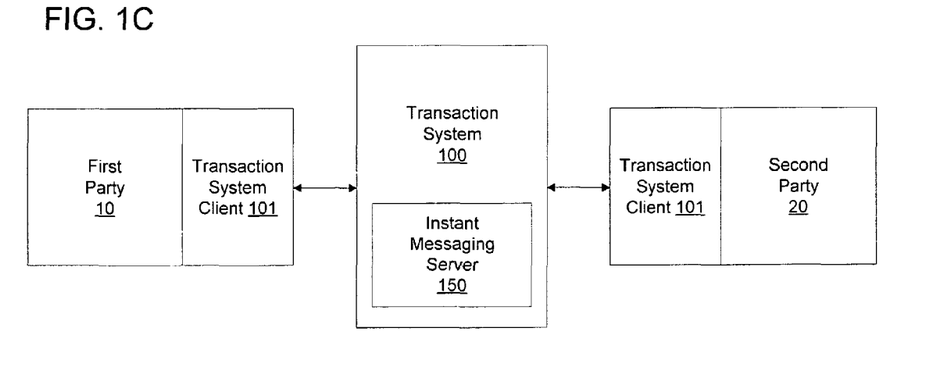

FIGS. 1A through 1C show examples of how the transaction system of the present invention is connected to the parties.

In FIG. 1A, transaction system 100 is connected to a first party 10, a second party 20, and an instant messaging (IM) server 150. First party 10 and second party 20 are also connected to IM server 150. First party 10 and second party 20 each have a transaction system client 101 and an IM client 151. Transaction system clients 101 provide a transaction system user interface for first party 10 and second party 20 to interact with transaction system 100. IM clients 151 provide an IM user interface for first party 10 and second party 20 to communicate with each other via instant messaging through IM server 150.

In FIG. 1B, second party 20 does not have a transaction system client 101 and is not able to interact directly with transaction system 100. However, first party 10 and second party 20 are still able to communicate with each other via instant messaging through IM server 150 using IM clients 151.

In FIG. 1C, transaction system 100 includes IM server 150. Transaction system 100 is connected to first party 10 and second party 20. First party 10 and second party 20 each have transaction system clients 101. In this configuration, transaction system clients 101 provide both the transaction system user interface and the IM user interface thus incorporating IM clients 151. First party 10 and second party 20 interact with transaction system 100 using transaction system clients 101. First party 10 and second party 20 are also able to communicate with each other via instant messaging through IM server 150 using transaction system clients 101.

In the above examples, transaction system 100 may be connected to first party 10, second party 20, and IM server 150 directly or through a network such as a local area network, a wide area network, or the Internet. Transaction system 100 sends contact information about first party 10 and second party 20 to IM server 150, thus assisting IM server 150 in establishing IM sessions between first party 10 and second party 20. Transaction system client 101 may be a proprietary client program or an HTTP-based browser such as Windows Internet Explorer®. IM client 151 may be a proprietary IM client such as Yahoo! Messenger®, Windows Messenger®, AOL Instant Messenger®, or ICQ®.

IM server 150 serves first party 10 and second party 20 through IM clients 151. IM server 150 is capable of determining the instant messaging presence of first party 10 and second party 20 when first party 10 and second party 20 start their IM clients 151. Even when one of the first party 10 or second party 20 do not start their IM clients 151, the presence of the inactive first party 10 or second party 20 is determinable by the IM server 150. IM server 150 is capable of establishing and conducting instant messaging sessions between first party 10 and second party 20. IM server 150 may be maintained by the same entity that runs transaction system 100 or a different entity.

Note that FIGS. 1A-1C are intended to indicate connections and communications between the various components and are not limited to any particular physical arrangement or location of these components. For example, transaction system 100 and/or IM server 150 can be located in physical proximity to either or both first party 10 and second party 20.

Figure 1D:
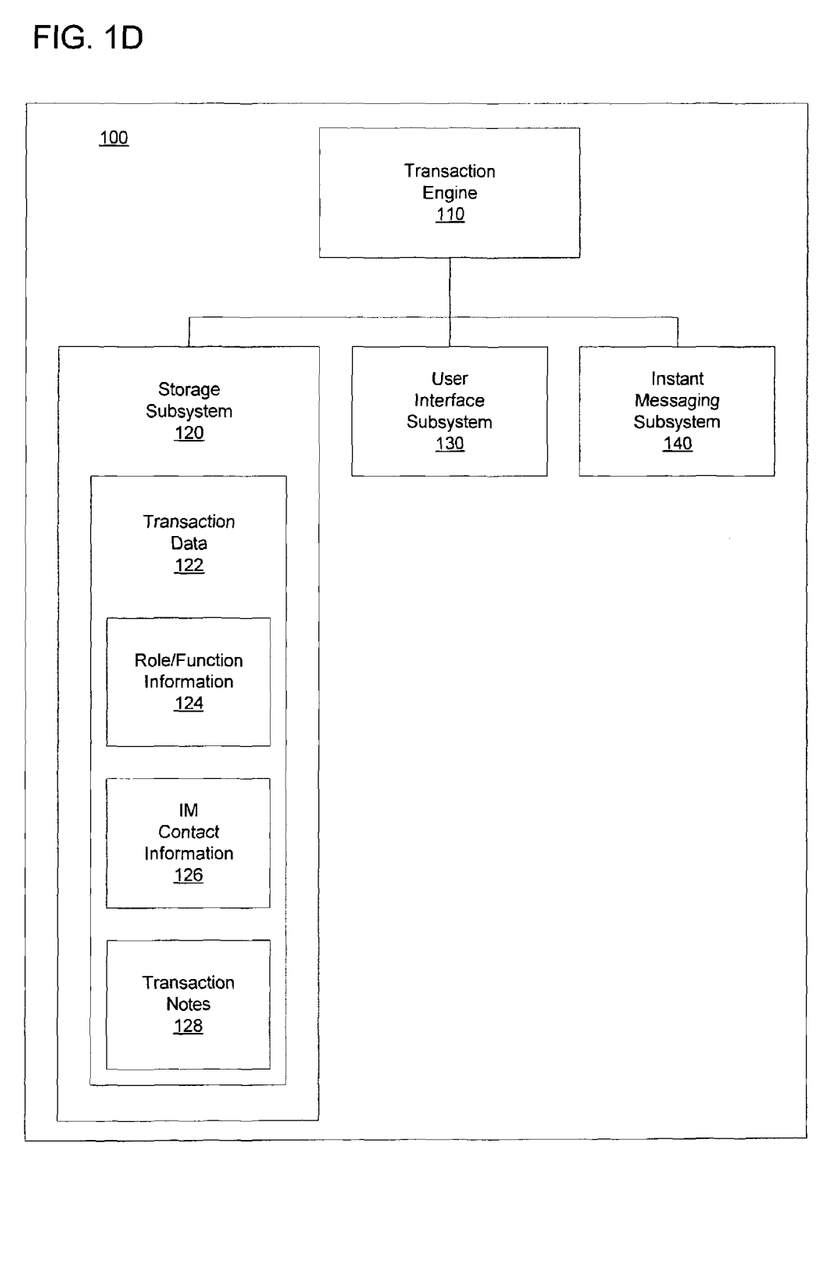
FIG. 1D shows one embodiment of a transaction system of the present invention.

FIG. 1D shows one embodiment of transaction system 100 of the present invention. Transaction system 100 includes a transaction engine 110 connected to a storage subsystem 120, a user interface (UI) subsystem 130, and an IM subsystem 140.

Storage subsystem 120 is capable of storing transaction data 122, including role/function information 124 and IM contact information 126 for first party 10 and second party 20. For example, role/function information 124 may indicate whether a particular party is the buyer or the seller in a sales transaction. IM contact information 126 may include a particular IM service and a username or login ID for the IM service. Transaction system 100 is also capable of storing transaction notes 128. Transaction notes 128 can include notes made by first party 10 and/or second party 20, and the saved content of any IM sessions between first party 10 and second party 20.

UI subsystem 130 interfaces with transaction system clients 101 to provide a user interface to first party 10 and/or second party 20. IM subsystem 140 is capable of interfacing with IM server 150. IM subsystem 140 is capable of querying IM server 150 to determine which IM clients 151 (and, hence, which parties) are currently connected to IM server 150. IM subsystem 140 is also capable of using IM contact information 126 to assist IM server 150 in establishing IM sessions between first party 10 and second party 20.

Figure 2:
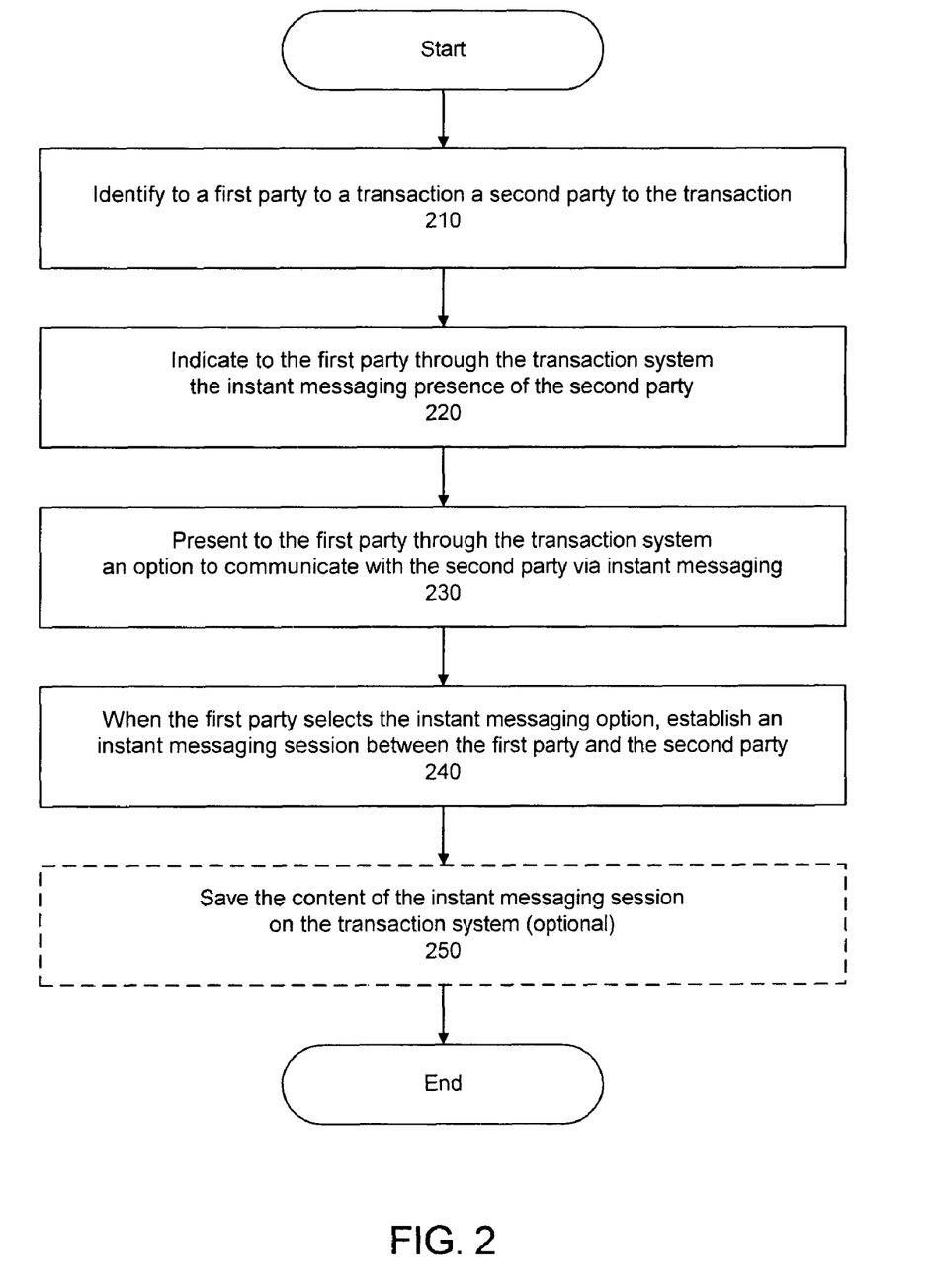
FIG. 2 shows one embodiment of a method for transaction communication of the present invention.

FIG. 2 shows one embodiment of a method for transaction communication of the present invention. The method involves identifying to a first party to a transaction the second party to the transaction (block 210), indicating to the first party through the transaction system the instant messaging presence of the second party (block 220), and presenting to the first party through the transaction system an option to communicate with the second party via instant messaging (block 230). When the first party selects the option to communicate with the second party via instant messaging, an instant messaging session is established between the first party and the second party (block 240). Optionally, the content of the instant messaging session is saved on the transaction system (block 25). The method will now be explained in further detail.

The second party to the transaction is identified to the first party (block 210). When first party 10 accesses transaction system 100 to view transaction data 122 for a particular transaction, transaction engine 110 accesses transaction data 122 to obtain role/function information 124 and IM contact information 126 for second party 20. Transaction data 122 may be gathered earlier during a collection or registration process, or retrieved from a database. Transaction engine 110 performs a sorting or matching process based on transaction data 122 to generate one or more lists of suitable contacts at second party 20 to be displayed through UI subsystem 130 to first party 10. For example, if first party 10 is a buyer accessing transaction system 100 to review a particular transaction, then second party 20 may be a seller, and a list of seller contacts for the transaction is then generated and presented to first party 10. If first party 10 is a seller, then second party 20 may be a buyer and a list of buyer contacts is generated. This sorting or matching process may be performed according to one or more criteria, including company, department, function, level, particular transaction, and IM security option established by the first party 10 and/or second party 20.

The instant messaging presence of the second party is indicated to the first party through the transaction system (block 220). Along with displaying a list of suitable contacts for second party 20, IM subsystem 140 queries IM server 150 to determine which individuals on the list of contacts for second party 20 are currently online and available for an IM session. Note that even when the individuals at second party 20 are not currently online or available for an IM session, first party 10 can still send instant messages to the individuals at second party 20 depending on the IM server 150 options for offline messages. These instant messages may be stored by IM server 150 and displayed the next time the individuals at second party 20 connect to IM server 150.

An option to communicate with the second party via instant messaging is presented to the first party through the transaction system (block 230). UI subsystem 130 may present a "Chat" button or some other display icon which establishes an IM session when clicked or selected. A separate IM option may be presented for each individual at second party 20. A separate IM option may also be presented for each IM service available. For example, if first party 10 is a buyer, then a list of contacts at second party 20 may be presented, each of the contacts shown as having one or more separate IM service icons.

The chat option may be presented in any suitable location. For example, in an invoice system, this option may be presented on an invoice information page for a disputed invoice to allow the parties to communicate instantly about the disputed invoice.

In one embodiment, prior to showing possible IM contacts, the options to communicate via instant messaging are filtered by the type of username or login ID stored for the first party 10 in the IM Contact Information 126. If Yahoo! Messenger® IDs are the only type of username or login ID stored for the first party 10 in the IM Contact Information 126, then only second party 20 users with Yahoo! Messenger® usernames or login IDs in the IM Contact Information 126 are presented to the first party 10.

When the option to communicate via instant messaging is selected by the first party, an instant messaging session is established between the first party and the second party (block 240). IM subsystem 140 will check to see if first party 10 has an appropriate IM client 151 installed. For example, if first party 10 has requested an IM session with second party 20 via Yahoo! Messenger®, then IM subsystem 140 will check to see that first party 10 has a Yahoo! Messenger® client installed. IM subsystem 140 may also check for and suggest a multi-platform IM client 151 such as Trillium®.

If IM subsystem 140 determines that first party 10 does not have an appropriate IM client 151 installed, then first party 10 is prompted to install an IM client 151 or is directed to download and install an IM client 151. If IM subsystem 140 determines that first party 10 already has a suitable IM client 151 installed but IM client 151 is not currently running, then IM subsystem 140 will start IM client 151. If IM subsystem 140 determines that first party 10 already has a suitable IM client 151 installed and running, but first party 10 is not logged in, then first party 10 will be prompted to log in or will automatically be logged in by IM subsystem 140. When first party 10 selects the IM option, the IM username or login ID of second party 20 is prepopulated in IM client 151. If there is more than one contact at second party 20, IM client 151 will be prepopulated with the IM username or login ID of the contact selected by first party 10.

Optionally, the content of the instant messaging session is saved on the transaction system (block 250). Transaction system 100 is capable of saving the content of the instant messaging session automatically in transaction notes 128 and associating the content with the particular transaction. IM subsystem 140 may access IM client 151 of both or either parties to access this information. Transaction system 100 may access IM client 151 when IM client 151 is closed or at the instruction of either party. The content of the instant messaging session may also be manually copied-and-pasted by either party from the IM client chat window to a user interface generated by UI subsystem 130.

FIGS. 3 through 8B show screenshots of an example of a user interface generated by UI subsystem 130. In this example, a user interface for an electronic invoice presentment and payment (EIPP) system is shown. Although this example shows a user interface tailored for a buyer, a similar user interface may be used for a seller or other party.

Figure 3:
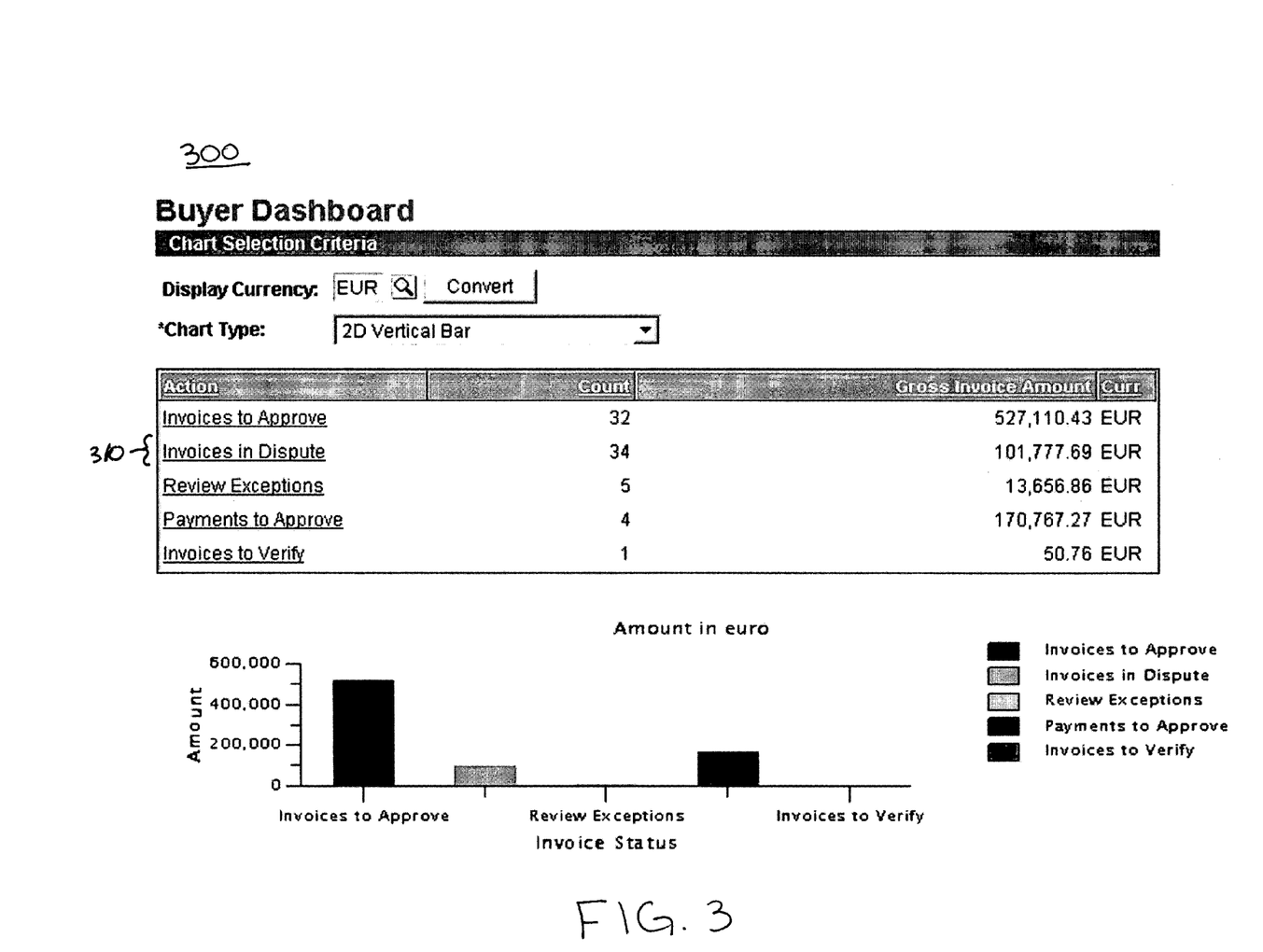
FIG. 3 shows an example of an invoice filter page.

FIG. 3 shows an example of an invoice filter page 300. Invoice filter page 300 provides several invoice filter options, including an option to apply an "Invoices in Dispute" filter 310. Selecting (e.g., by placing a cursor over and pressing a computer mouse button or "clicking" on) the "Invoices in Dispute" filter 310 generates a request to display a list of invoices in dispute.

Figure 4A:
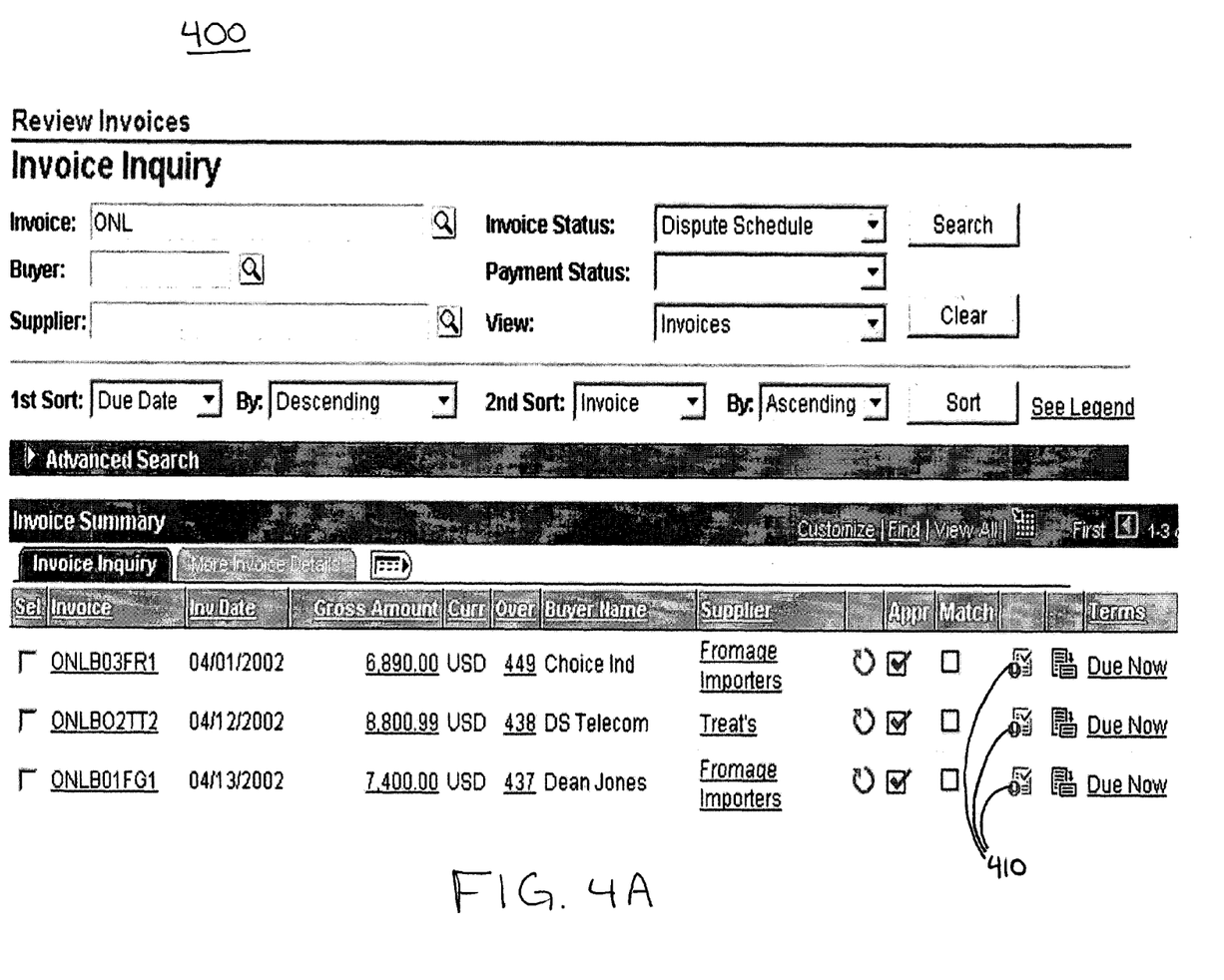
FIG. 4A through 4B show examples of an invoice list page.

FIG. 4A shows an example of an invoice list page 400 generated when the "Invoices in Dispute" filter 310 of FIG. 3 is selected. Invoice list page 400 shows a list of invoices in dispute and, in this example, information about each invoice. Invoice list page 400 shows a dispute indicator 410 for each invoice in dispute. Selecting a dispute indicator 410 generates a request for an invoice information page.

Figure 4B:
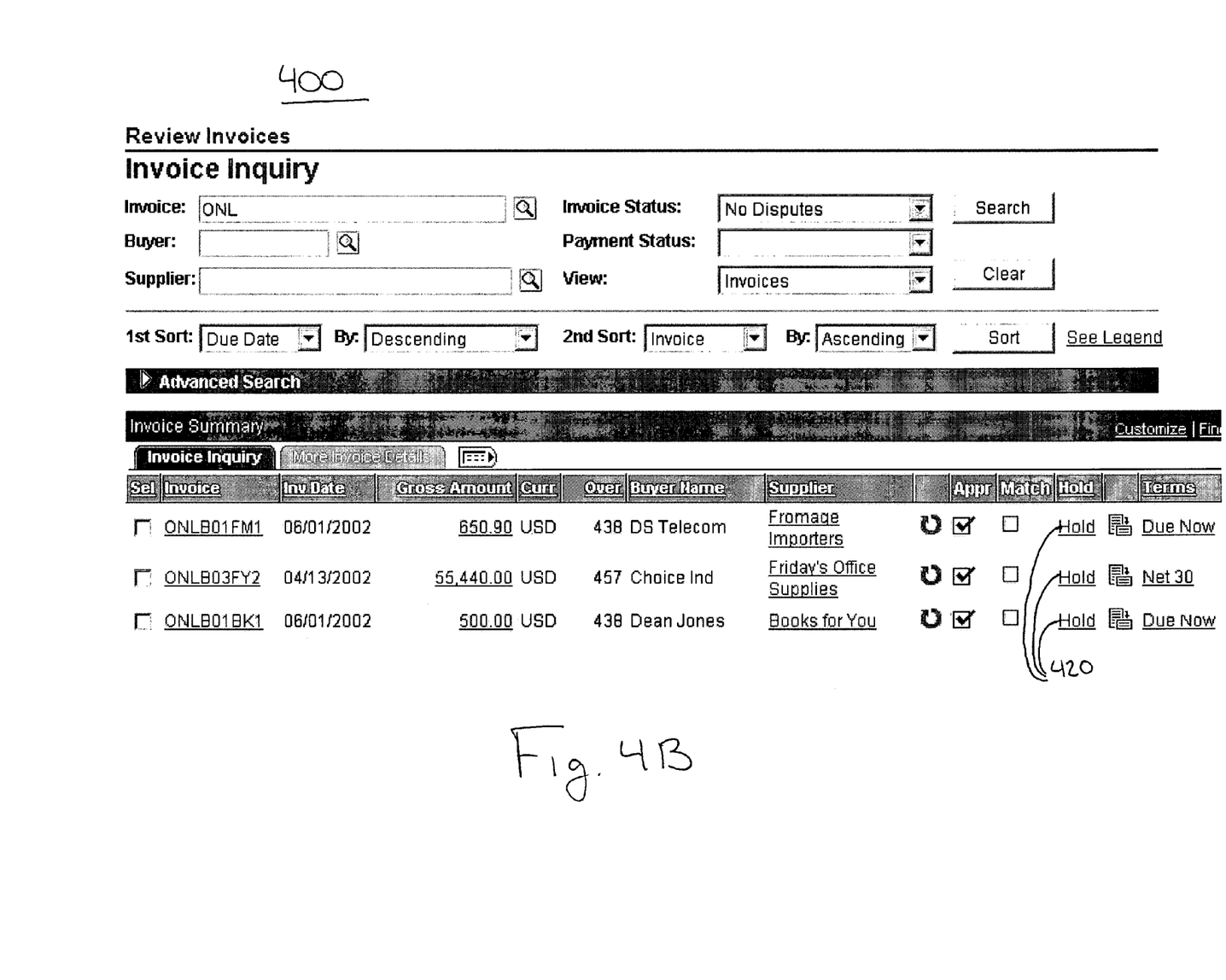

FIG. 4B shows another example of an invoice list page 400. Invoice list page 400 shows a hold action link 420 for each invoice not in dispute. An invoice can be placed on hold when first party 10 clicks a hold action link 420. For a variety of reasons a hold condition can be initiated pending some action by either or both parties or discussion between the parties.

When an invoice dispute has been resolved, dispute indicator 410 will change color to indicate resolution. Selecting dispute indicator 410 after an invoice dispute has been resolved will still bring up the invoice information history on an invoice information page.

Figure 5:
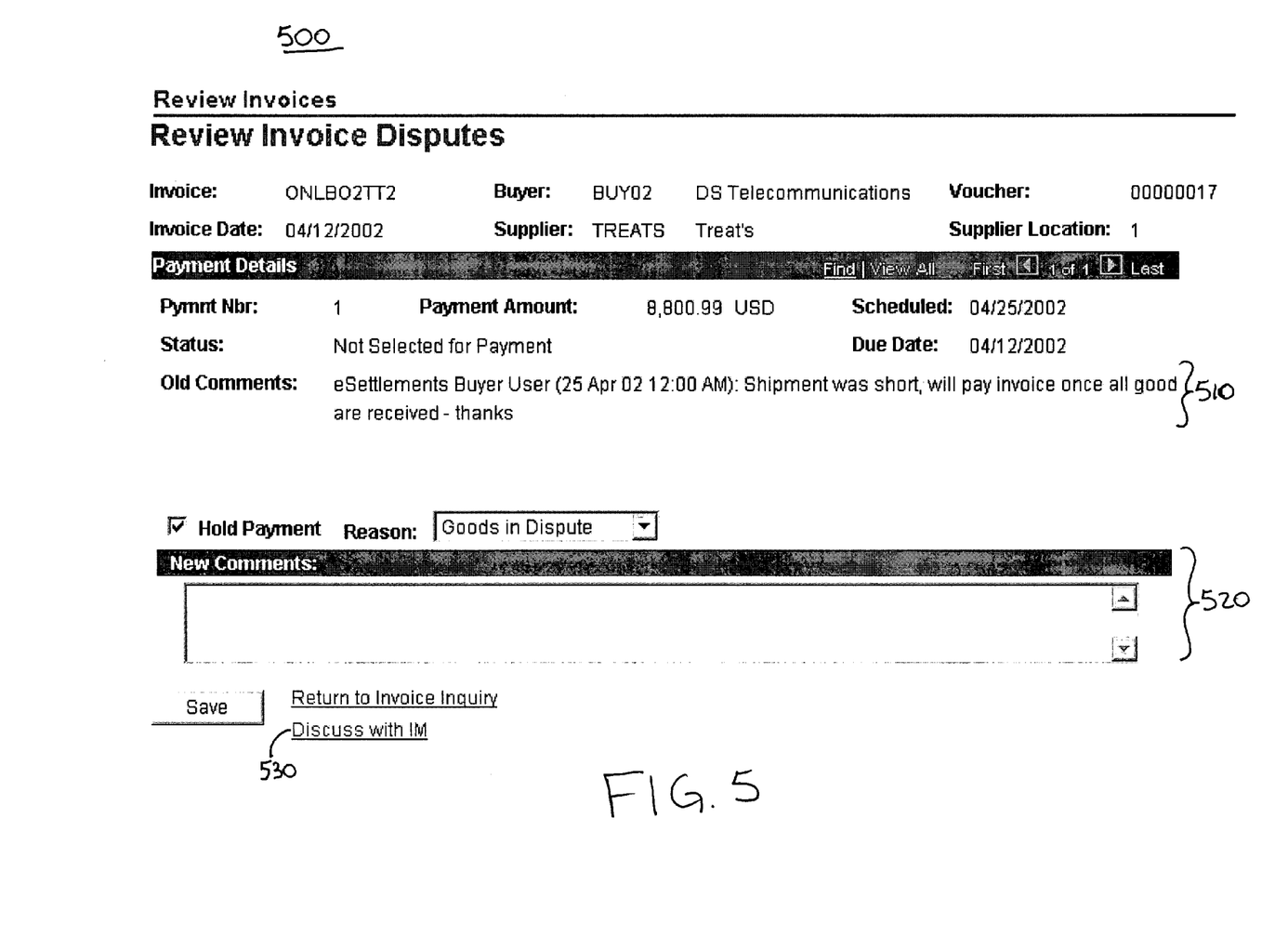
FIG. 5 shows an example of an invoice information page.

FIG. 5 shows an example of an invoice information page 500 generated when a dispute indicator 410 or hold link 420 is selected. Invoice information page 500 shows information about a particular invoice. Invoice information page 500 includes an "Old Comments" area 510 where previously entered comments and/or notes about a previous communication between the parties are retrieved from transaction notes 128 and displayed. Invoice information page 500 also includes a "New Comments" area 520 where new comments can be entered and saved in transaction notes 128.

Invoice information page 500 also includes a "Discuss with IM" option 530. Note that the "Discuss with IM" option 530 can be configured to be available for any invoice, not only invoices in dispute or on hold. As such, the "Discuss with IM" option 530 may be displayed on invoice list page 400 of FIGS. 4A-4B. Regardless of location, selecting the "Discuss with IM" option 530 will generate a request for an IM contacts list page.

Figure 6:
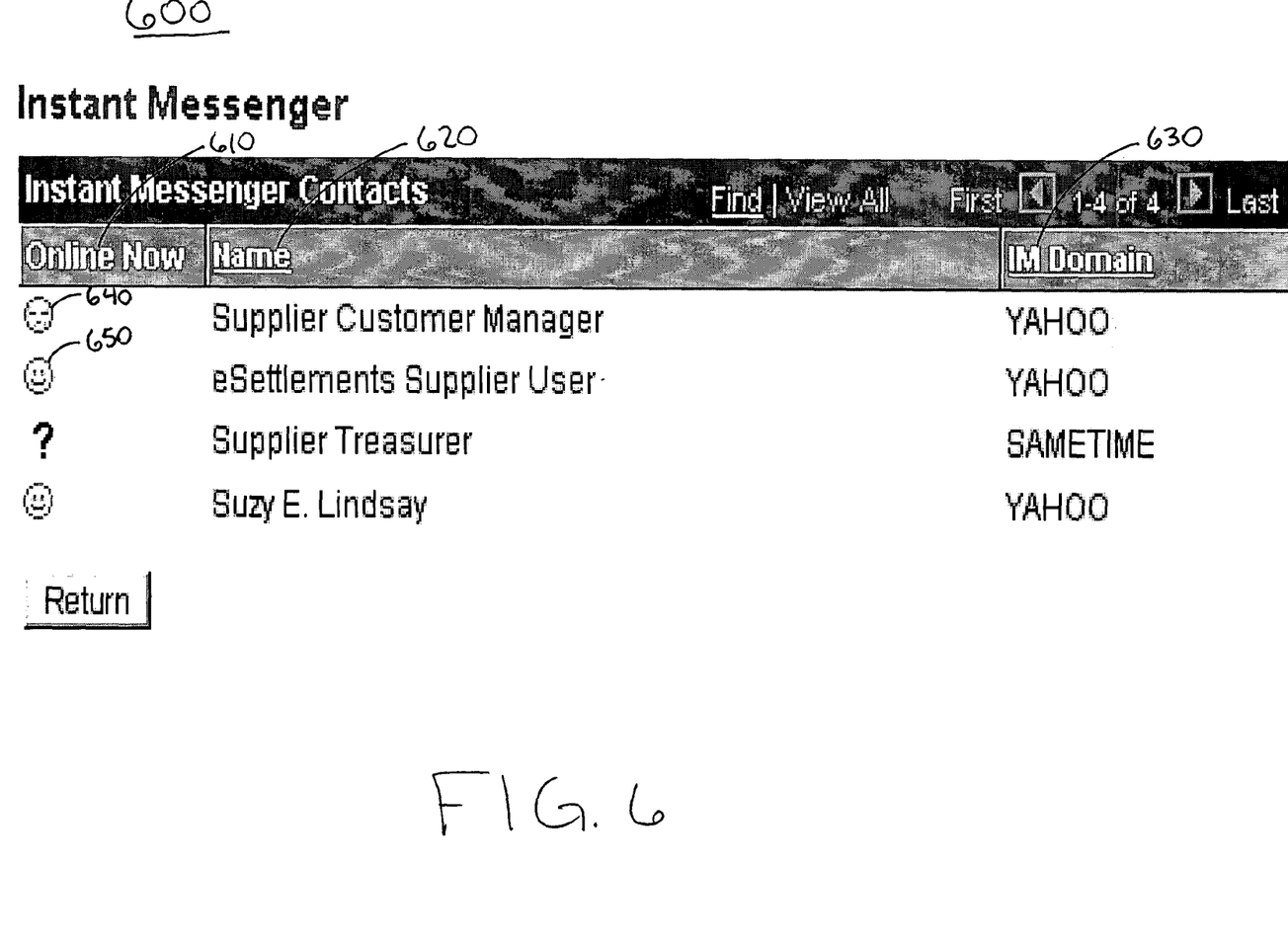
FIG. 6 shows an example of an instant messaging contacts list page.

FIG. 6 shows an example of an IM contacts list page 600 generated when the "Discuss with IM" option 530 is selected. For a particular invoice, transaction system 100 will generate a list of seller contacts for a buyer, or a list of buyer contacts for a seller. IM contacts list page 600 shows a list of contacts associated with a seller who would be appropriate for the buyer to communicate with regarding a particular transaction. A "Name" column 620 shows the name and/or function of each contact at the seller. An "IM Domain" column 630 shows the IM service subscribed to by each contact. Transaction system 100 is able to generate this page when transaction engine 110 accesses and retrieves transaction data 122.

For each contact on IM contacts list page 600, IM subsystem 140 will query IM server 150 to determine whether each contact is currently online and available for an IM session. An "Online Now" column 610 indicates whether each contact is online and available with an online indicator 650 or an offline indicator 640. For example, Yahoo! Messenger® uses a smiley face as an online indicator 650 and a sleeping face as an offline indicator 640. As has been explained further herein, instant messages may be sent to both online and offline contacts depending on the offline message capabilities of the IM service.

IM subsystem 140 is capable of interfacing with more than one type of IM server 150 and more than one type of IM service. If a contact is accessible by more than one IM service (because more than one IM ID is associated with the first party 10), then each service is listed in the "IM Domain" column 630. Different IM services may use different online indicators 650 and offline indicators 640, which may all be placed in the "Online Now" column 610. Alternatively, a single uniform or generic online indicator 650 may be used for multiple IM services.

In this example, the online indicator 650 or offline indicator 640 for the contact also acts as a button or link that starts an IM session. Alternatively, a separate "talk" or "chat" button may be implemented and used to start an IM session. As explained further herein, starting an IM session prompts the buyer to install an IM client 151 if necessary, starts the IM client 151 if necessary, prompts the buyer to login to the IM client 151 if necessary, and starts an IM session with the seller.

Figure 7:
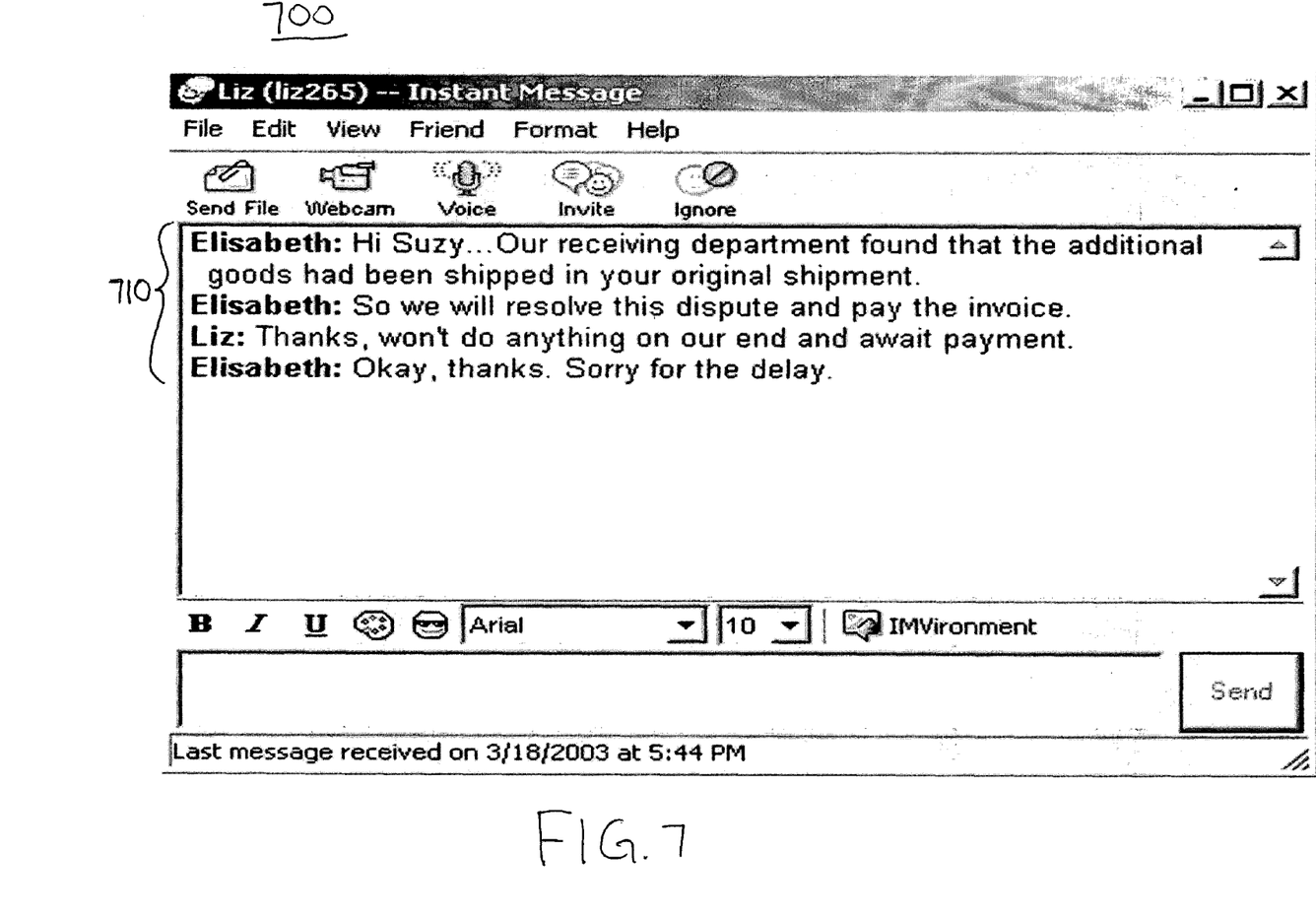
FIG. 7 shows a screen shot of a chat window for an instant messaging client.

FIG. 7 shows an example of an IM chat window 700 showing a session dialogue 710 between two parties regarding a disputed invoice. Although this example shows a Yahoo! Messenger® IM chat window, any suitable IM service may be used, including Windows Messenger®, AOL Instant Messenger®, IBM's Lotus Sametime, and ICQ®.

Figure 8A:
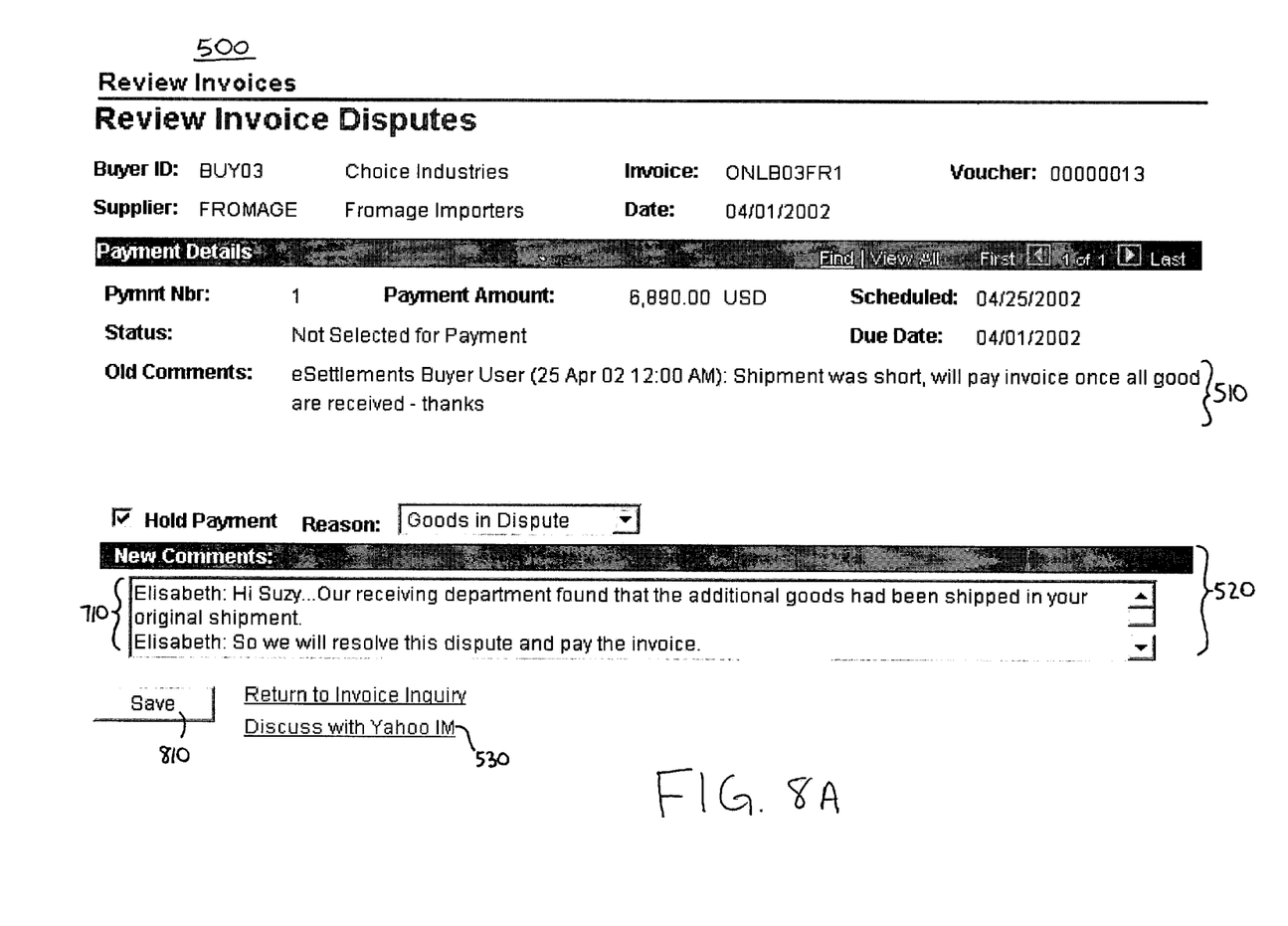
FIGS. 8A and 8B show another example of an invoice information page.
Figure 8B:
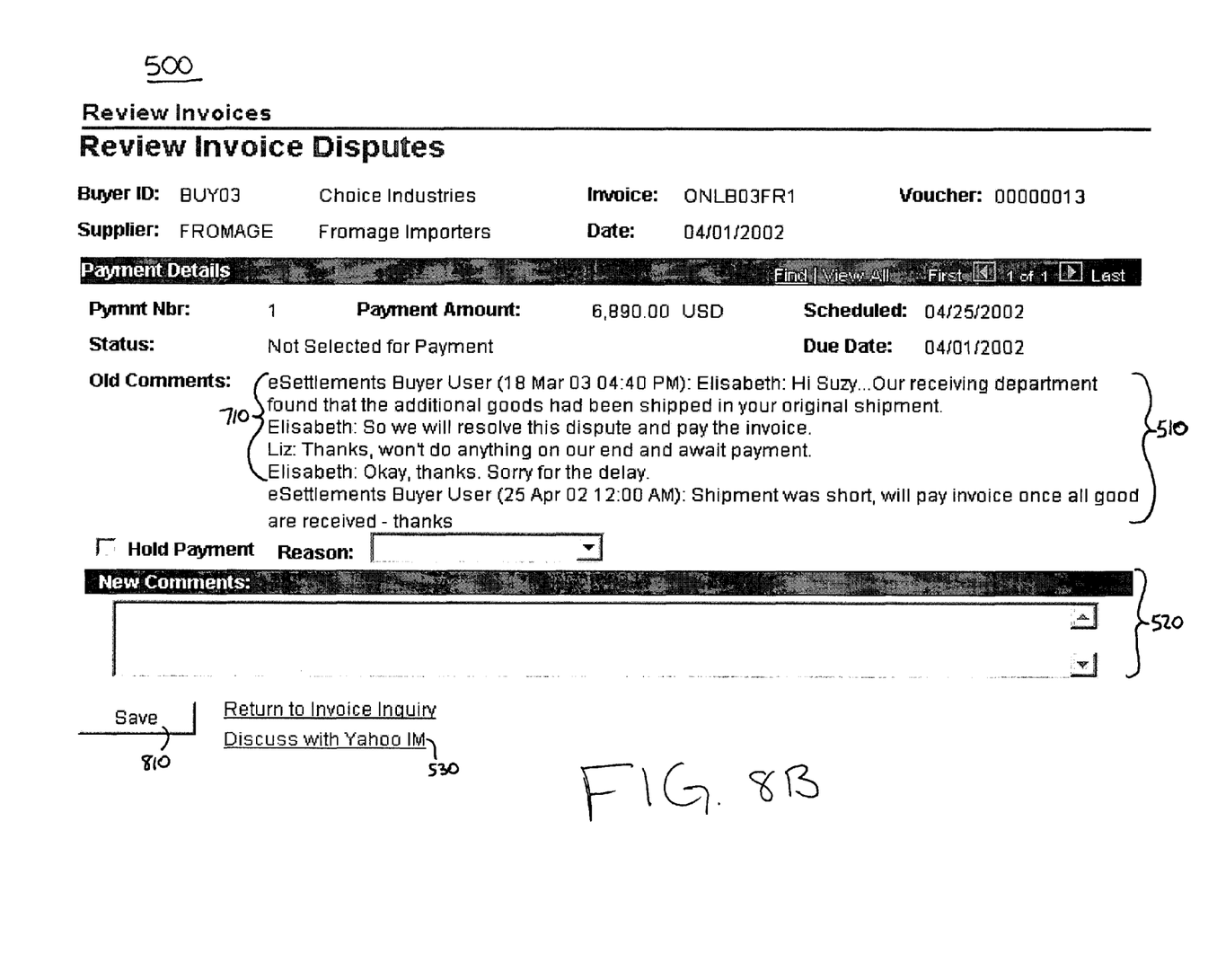

FIGS. 8A and 8B show another example of invoice information page 500. FIG. 8A shows the session dialogue 710 (FIG. 7) from the IM session displayed in "New Comments" area 520. Note that display of session dialogue 710 in "New Comments" area 520 may be performed by the buyer manually performing a copy-and-paste operation of the relevant discussion information from IM chat window 700 to "New Comments" area 520. Alternatively, "New Comments" area 520 may automatically be populated with dialogue 710 upon conclusion of the IM session or based on the buyer initiating a transfer from IM chat window 700 to "New Comments" area 520. Selecting a "Save" button 810 will save session dialogue 710 displayed in "New Comments" area 520.

Note that in an alternative embodiment IM chat window 700 is incorporated directly into the user interface thus supporting IM sessions within a page such as invoice information page 500. For example, session dialog 710 may be displayed in "New Comments" area 520 during the IM session.

FIG. 8B shows session dialogue 710 after it has been saved in transaction notes 128 and is now displayed in the "Old Comments" area 510 along with previously stored notes. Transaction system 100 is capable of accessing session dialogue 710 in IM chat window 700 and saving it automatically on storage subsystem 120. This may be done when IM chat window 700 is closed or when "Save" button 810 is selected.

The transaction system described above may also be used for many other types of transactions or other applications. For example, the transaction system could be integrated into a customer relations management (CRM) system to allow customer relations staff to communicate with customers via instant messaging regarding various matters. The transaction system could be integrated into an asset management system to allow auditors and other asset management personnel to communicate with asset owners via instant messaging regarding physical assets, physical inventory, and other asset management matters. The transaction system could be integrated into an expense report system to allow expense report reviewers to communicate with expense report filers via instant messaging regarding expense report issues. The transaction system could be integrated into a human resources system to allow human resources staff to communicate with employees via instant messaging regarding human resources matters.

While the invention has been described in terms of some specific examples and in some specific embodiments, it will be clear that this invention is not limited to these specific examples and embodiments and that many changes and modified embodiments will be obvious to those skilled in the art without departing from the true spirit and scope of the invention as defined in the appended claims.

I claim:

1. A method for facilitating communication between parties to transactions, the method comprising:
    identifying, with one or more processors associated with one or more computer systems, a user accessing a database as a first party to a transaction having transaction data stored in the database, the user identified as the first party to the transaction in response to the user accessing a portion of the transaction data stored in the database, wherein the transaction data includes instant messaging contact information for the first party to the transaction and one or more second parties to the transaction, the first party and the one or more second parties being at least one of a buyer or seller in the transaction;
    determining, with the one or more processors associated with one or more computer systems, instant messaging contact information for the first party to the transaction based on the transaction data stored in the database;
    determining, with the one or more processors associated with one or more computer systems, instant messaging contact information for at least one second party to the transaction based on the transaction data stored in the database;
    generating, with the one or more processors associated with one or more computer systems, an invoice information page that directly integrates both invoice data details of the transaction and an instant message chat interface that supports instant message sessions between the first party to the transaction and the at least one second party to the transaction directly within the invoice information page while the first party to the transaction is viewing the invoice data details of the transaction on the invoice information page such that contents of the instant messaging sessions are added to the transaction data stored in the database for the transaction;
    initiating, with the one or more processors associated with the one or more computer systems, an instant messaging session between the first party to the transaction and the at least one second party to the transaction in response to the first party interacting with the instant message chat interface; and
    updating, with the one or more processors associated with the one or more computer systems, the transaction data stored in the database with content of the instant messaging session between the first party to the transaction and the at least one second party to the transaction.

2. The method of claim 1, wherein the transaction data stored in the database includes role information for the at least one second party.

3. The method of claim 2, wherein the role information is used in identifying the second party to the first party on the generated page.

4. The method of claim 1, further comprising:
    determining, with the one or more processors associated with the one or more computer systems, presence of the at least one second party to the transaction in response to querying an instant messaging server; and
    generating, with the one or more processors associated with the one or more computer systems, an option on the page to communicate via instant messaging with the at least one second party to the transaction when the presence of the at least one second party to the transaction indicates that the at least one second party is available to instant message.

5. The method of claim 1, wherein initiating, with the one or more processors associated with the one or more computer systems, the instant messaging session between the first party to the transaction and the at least one second party to the transaction in response to the first party interacting with the instant message chat interface comprises initiating the instant messaging session through an instant messaging service of a transaction system.

6. The method of claim 1, wherein initiating, with the one or more processors associated with the one or more computer systems, the instant messaging session between the first party to the transaction and the at least one second party to the transaction in response to the first party interacting with the instant message chat interface comprises initiating the instant messaging session through an external instant messaging service.

7. The method of claim 1, wherein initiating, with the one or more processors associated with the one or more computer systems, the instant messaging session between the first party to the transaction and the at least one second party to the transaction in response to the first party interacting with the instant message chat interface comprises:
  prompting the first party to install an instant messaging client if the instant messaging client is not installed;
  starting the instant messaging client if the instant messaging client has not been started; and
  prompting the first party to login to the instant messaging client if the first party is not already logged in to the instant messaging client.

8. A non-transitory computer-readable medium storing computer-executable code for facilitating communication between parties to transactions, the non-transitory computer-readable medium comprising:
  code for identifying a user accessing a database as a first party to a transaction having transaction data stored in the database, the user identified as the first party to the transaction in response to the user accessing a portion of the transaction data stored in the database, wherein the transaction data includes instant messaging contact information for the first party to the transaction and one or more second parties to the transaction, the first party and the one or more second parties being at least one of a buyer or seller in the transaction;
  code for determining instant messaging contact information for the first party to the transaction based on the transaction data stored in the database;
  code for determining instant messaging contact information for at least one second party to the transaction based on the transaction data stored in the database;
  code for generating an invoice information page that directly integrates both invoice data details of the transaction and an instant message chat interface that supports instant message sessions between the first party to the transaction and the at least one second party to the transaction directly within the invoice information page while the first party to the transaction is viewing the invoice data details of the transaction on the invoice information page such that contents of the instant messaging sessions are added to the transaction data stored in the database for the transaction;
  code for initiating an instant messaging session between the first party to the transaction and the at least one second party to the transaction in response to the first party interacting with the instant message chat interface; and
  code for updating the transaction data stored in the database with content of the instant messaging session between the first party to the transaction and the at least one second party to the transaction.

9. The non-transitory computer-readable medium of claim 8, wherein the transaction data stored in the database includes role information for the at least one second party.

10. The non-transitory computer-readable medium of claim 9, wherein the role information is used in identifying the second party to the first party on the generated page.

11. The non-transitory computer-readable medium of claim 8, further comprising:
  code for determining presence of the at least one second party to the transaction in response to querying an instant messaging server; and
  code for generating an option on the page to communicate via instant messaging with the at least one second party to the transaction when the presence of the at least one second party to the transaction indicates that the at least one second party is available to instant message.

12. The non-transitory computer-readable medium of claim 8, wherein the code for initiating the instant messaging session between the first party to the transaction and the at least one second party to the transaction in response to the first party interacting with the instant message chat interface comprises code for initiating the instant messaging session through an instant messaging service of a transaction system.

13. The non-transitory computer-readable medium of claim 8, wherein the code for initiating the instant messaging session between the first party to the transaction and the at least one second party to the transaction in response to the first party interacting with the instant message chat interface comprises code for initiating the instant messaging session through an external instant messaging service.

14. The non-transitory computer-readable medium of claim 8, wherein the code for initiating the instant messaging session between the first party to the transaction and the at least one second party to the transaction in response to the first party interacting with the instant message chat interface comprises:
  code for prompting the first party to install an instant messaging client if the instant messaging client is not installed;
  code for starting the instant messaging client if the instant messaging client has not been started; and
  code for prompting the first party to login to the instant messaging client if the first party is not already logged in to the instant messaging client.

15. A system for facilitating communication between parties to transactions, the system comprising:
  a database server computer system configured to store transaction data associated with a transaction; and
  one or more computer systems configured to:
    identify a user accessing the database as a first party to the transaction, the user identified as the first party to the transaction in response to the user accessing a portion of the transaction data stored in the database, wherein the transaction data includes instant messaging contact information for the first party to the transaction and one or more second parties to the transaction, the first party and the one or more second parties being at least one of a buyer or seller in the transaction;
    determine instant messaging contact information for the first party to the transaction based on the transaction data stored in the database;
    determine instant messaging contact information for at least one second party to the transaction based on the transaction data stored in the database;
    generate an invoice information page that directly integrates both invoice data details of the transaction and an instant message chat interface that supports instant message sessions between the first party to the transaction and the at least one second party to the transaction directly within the invoice information page while the first party to the transaction is viewing the invoice data details of the transaction on the invoice information page such that contents of the instant messaging sessions are added to the transaction data stored in the database for the transaction;

initiate an instant messaging session between the first party to the transaction and the at least one second party to the transaction in response to the first party interacting with the instant message chat interface; and update the transaction data stored in the database with content of the instant messaging session between the first party to the transaction and the at least one second party to the transaction.

16. The system of claim 15, wherein the one or more computer systems are further configured to:

determine presence of the at least one second party to the transaction in response to querying an instant messaging server; and generate an option on the page to communicate via instant messaging with the at least one second party to the transaction when the presence of the at least one second party to the transaction indicates that the at least one second party is available to instant message.

17. The system of claim 15, wherein to initiate the instant messaging session between the first party to the transaction and the at least one second party to the transaction in response to the first party interacting with the instant message chat interface the one or more computer systems are configured to initiate the instant messaging session through an instant messaging service associated with the one or more computer systems.

18. The system of claim 15, wherein to initiate the instant messaging session between the first party to the transaction and the at least one second party to the transaction in response to the first party interacting with the instant message chat interface the one or more computer systems are configured to initiate the instant messaging session through an external instant messaging service.

* * * * *

UNITED STATES PATENT AND TRADEMARK OFFICE
CERTIFICATE OF CORRECTION

| | |
|---|---|
| PATENT NO. | : 8,145,714 B2 |
| APPLICATION NO. | : 10/641628 |
| DATED | : March 27, 2012 |
| INVENTOR(S) | : Barry |

It is certified that error appears in the above-identified patent and that said Letters Patent is hereby corrected as shown below:

In column 2, line 22, delete "screen shot" and insert -- screenshot --, therefor.

In column 5, line 6, delete "usemame" and insert -- username --, therefor.

In column 5, line 10, delete "usemames" and insert -- usernames --, therefor.

Signed and Sealed this
Seventeenth Day of July, 2012

David J. Kappos
*Director of the United States Patent and Trademark Office*